(12) United States Patent
Gorkovenko et al.

(10) Patent No.: US 6,878,488 B2
(45) Date of Patent: *Apr. 12, 2005

(54) CATHODES COMPRISING ELECTROACTIVE SULFUR MATERIALS AND SECONDARY BATTERIES USING SAME

(75) Inventors: Alexander Gorkovenko, Tucson, AZ (US); Terje A. Skotheim, Tucson, AZ (US); Zhe-Sheng Xu, Tucson, AZ (US)

(73) Assignee: Moltech Corporation, Tucson, AZ (US)

( * ) Notice: Subject to any disclaimer, the term of this patent is extended or adjusted under 35 U.S.C. 154(b) by 81 days.

This patent is subject to a terminal disclaimer.

(21) Appl. No.: 10/172,598

(22) Filed: Jun. 14, 2002

(65) Prior Publication Data

US 2003/0003360 A1 Jan. 2, 2003

Related U.S. Application Data

(60) Continuation of application No. 09/703,348, filed on Oct. 31, 2000, now Pat. No. 6,406,814, which is a division of application No. 08/994,708, filed on Dec. 19, 1997, now Pat. No. 6,210,831.

(51) Int. Cl.[7] ............................ H01M 4/58; H01M 4/60
(52) U.S. Cl. ...................................... 429/213; 429/218.1
(58) Field of Search ................................ 429/212, 213, 429/218.1

(56) References Cited

U.S. PATENT DOCUMENTS

| | | | |
|---|---|---|---|
| 3,532,543 A | 10/1970 | Nole et al. | |
| 3,639,174 A | 2/1972 | Kegelman | |
| 3,806,369 A | 4/1974 | Dey et al. | |
| 3,907,591 A | 9/1975 | Lauck | |
| 3,953,231 A | 4/1976 | Farrington et al. | |
| 3,993,503 A | 11/1976 | Ludwig | |

(Continued)

FOREIGN PATENT DOCUMENTS

| | | |
|---|---|---|
| DE | 19650766 | 6/1997 |
| JP | 9-147868 | 6/1997 |
| WO | WO 96/41387 | 12/1996 |
| WO | WO 97/44840 | 11/1997 |

OTHER PUBLICATIONS

Chemical Abstracts, Columbus, OH. U.S., Abstract No. 127:97512, "Secondary Sulfide Batteries with Activated Carbon Fiber Cathodes and the Activated Carbon Fibers" Corresponding to JP 9–147868 A2. Jun. 1997.

Patent Abstract of Japan, "Sulfide Secondary Battery and Activated Carbon Fiber for Electrode Material," corresponding to JP-9–147868, Jun. 1997.

Peled, E. et al. (1989). "Rechargeable Lithium–Sulfur Battery (Extended Abstract,) " *J. Power Sources.* 26(3/4): 269–271, no month available.

Ruthven, D. ed. (1991). "Adsorption." *Kirk–Othmer Encyclopedia of Chemical Technology,* 4th ed., vol. 1 (A to Alkolids). John Wiley & Sons: New York, pp 493–528, no month available.

(Continued)

*Primary Examiner*—Susy Tsang-Foster
(74) *Attorney, Agent, or Firm*—David E. Rogers; Jacqueline M. Nicol; Squire, Sanders & Dempsey L.L.P.

(57) ABSTRACT

The present invention pertains to solid composite cathodes which comprise (a) an electroactive sulfur-containing cathode material which, in its oxidized state, comprises a polysulfide moiety of the formula, —$S_m$—, wherein m is an integer from 3 to 10; and (b) a non-electroactive particulate material having a strong adsorption of soluble polysulfides. The present invention also pertains to electric current producing cells comprising such solid composite cathodes, and methods of making such solid composite cathodes and electric current producing cells.

18 Claims, 4 Drawing Sheets

U.S. PATENT DOCUMENTS

| | | |
|---|---|---|
| 4,237,200 A | 12/1980 | Weddigen |
| 4,303,748 A | 12/1981 | Armand et al. |
| 4,683,179 A | 7/1987 | Langpape et al. |
| 4,833,048 A | 5/1989 | De Jonghe et al. |
| 4,917,974 A | 4/1990 | De Jonghe et al. |
| 5,162,175 A | 11/1992 | Visco et al. |
| 5,324,599 A | 6/1994 | Oyama et al. |
| 5,441,831 A | 8/1995 | Okamoto et al. |
| 5,506,072 A | 4/1996 | Griffin et al. |
| 5,516,598 A | 5/1996 | Visco et al. |
| 5,523,179 A | 6/1996 | Chu |
| 5,529,860 A | 6/1996 | Skotheim et al. |
| 5,532,077 A | 7/1996 | Chu |
| 5,538,812 A | 7/1996 | Lee et al. |
| 5,552,244 A | 9/1996 | Griffin et al. |
| 5,582,623 A | 12/1996 | Chu |
| 5,601,947 A | 2/1997 | Skotheim et al. |
| 5,665,492 A | 9/1997 | Sotomura |
| 5,686,201 A | 11/1997 | Chu |
| 5,690,702 A | 11/1997 | Skotheim et al. |
| 5,712,057 A | 1/1998 | Fauteux |
| 5,723,230 A | 3/1998 | Naoi et al. |
| 5,919,587 A | 7/1999 | Mukherjee et al. |

OTHER PUBLICATIONS

WPINDEX Abstract, Derwent Information Ltd., Accession No. 97–356162 [33], "Sulphide Secondary Battery for Effective Use of Energy–Comprises Active Carbon Fibre and Anode Electrode Material," Corresponding to JP 9–147868 A. Jun. 1997.

Yamin, H. et al (1983) "Electrochemistry of a Nonaqueous Lithium/Sulfur Cell," *J. Power Sorces* 9(3/4): 281–287, no month available.

US 6,878,488 B2

CATHODES COMPRISING ELECTROACTIVE SULFUR MATERIALS AND SECONDARY BATTERIES USING SAME

CROSS-REFERENCE TO RELATED APPLICATIONS

This application is a continuation of U.S. patent application Ser. No. 09/703,348, filed 31 Oct. 2000, now U.S. Pat. No. 6,406,814, which is a divisional of U.S. patent application Ser. No. 08/994,708, filed 19 Dec. 1997, now U.S. Pat. No. 6,210,831, the disclosure of which are incorporated by reference.

TECHNICAL FIELD

The present invention relates generally to the field of cathodes and rechargeable electric current producing cells. More particularly, the present invention pertains to solid composite cathodes which comprise (a) an electroactive sulfur-containing material which, in its oxidized state, comprises a polysulfide moiety of the formula, $-S_m-$, wherein m is an integer from 3 to 10; and, (b) a non-electroactive particulate material having a strong adsorption of soluble polysulfides. This strongly adsorbing particulate material significantly reduces or retards the diffusion of sulfur-containing electroactive materials from the cathode into the electrolyte and other cell components when incorporated into the cathode of an electric current producing cell. The present invention also pertains to electric current producing cells comprising such composite cathodes, and methods of making such solid composite cathodes and electric current producing cells.

BACKGROUND

Throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

As the rapid evolution of portable electronic devices continues, the need for safe, long-lasting, high capacity rechargeable batteries becomes increasingly evident. Under such circumstances, high energy density lithium secondary batteries are rapidly being developed that will eventually replace the conventional lead acid, nickel-cadmium, and nickel metal hydride batteries in many applications. In recent years, there has been considerable interest in developing high energy density cathode active materials and alkali metals as anode active materials for high energy density lithium secondary batteries to meet these needs.

Lithium and sulfur are highly desirable as the electrochemically active materials for the anode and cathode, respectively, of rechargeable or secondary battery cells because they provide nearly the highest energy density on a weight (2500 Wh/kg) or volume (2800 Wh/l) basis possible of any of the known combinations of materials. To obtain high energy densities, the lithium can be present as the pure metal, in an alloy or in an intercalated form, and the sulfur can be present as elemental sulfur or as a component in an organic or inorganic material with a high sulfur content, preferably greater than 50 weight per cent sulfur.

Hereinafter, anodes containing the element lithium in any form are referred to as lithium-containing anodes. Cathodes containing the element sulfur in any form are hereinafter referred to as sulfur-containing cathodes.

Many battery systems comprising alkali metal containing anodes and sulfur-containing cathodes have been described. Exemplary of high temperature cells incorporating molten alkali metal anodes and molten sulfur cathodes separated by a solid electrolyte are those described in U.S. Pat. Nos. 3,993,503, 4,237,200 and 4,683,179. For operation, these storage cells must be heated to temperatures greater than about 320° C. Of considerable recent interest are cells comprising alkali metal anodes and cathodes containing elemental sulfur that operate at considerably lower temperatures, particularly those with solid cathodes operating at ambient temperatures. Rechargeable lithium sulfur battery cells operating at room temperature have been described by Peled et al. in *J. Power Sources*, 1989, 26, 269–271, wherein the solid sulfur-containing cathodes are comprised of a porous carbon loaded with elemental sulfur. The nature of the porous carbon was not described, but cells constructed with these cathodes provided only a maximum of 50 cycles. The decline in capacity with cycling was attributed to loss of cathode active material.

U.S. Pat. No. 3,639,174 to Kegelman describes solid composite cathodes comprising elemental sulfur and a particulate electrical conductor. U.S. Pat. No. 4,303,748 to Armand et al. discloses solid composite cathodes containing an ionically conductive material together with elemental sulfur, transition metal salts, or other cathode active materials for use with lithium or other anodes in which, for example, the active sulfur or other cathode active material and the inert compounds with electrical conduction, such as graphite powder, are both particles of between 1 and 500 microns in diameter. Further examples of cathodes comprising elemental sulfur, an electrically conductive material and an ionically conductive material that operate in the temperature range from −40° C. to 145° C. are described in U.S. Pat. Nos. 5,523,179, 5,532,077, 5,582,623 and 5,686,201 to Chu. U.S. Pat Nos. 5,552,244 and 5,506,072 to Griffin et al. describe metal-sulfur batteries using a cathode comprising a mixture of finely divided sulfur and graphite packed around a conductive electrode and covered with a porous separator. A minimum of 10 weight per cent of graphite is needed to achieve sufficient conductivity in the cathode structure. No function other than providing conductivity is described for the graphite.

In spite of the many known systems, as for example described above, employing a solid cathode comprising elemental sulfur in rechargeable alkali metal sulfur battery systems has been problematic in obtaining good electrochemical efficiency and capacity, cycle life, and safety of the cells owing to the diffusion of sulfur active materials from the sulfur-containing cathode into the electrolyte and anode components. This has been particularly true in battery cells comprising a sulfur-containing cathode in combination with a lithium-containing anode. U.S. Pat. No. 3,907,591 to Lauck and an article by Yamin et al. in *J. Power Sources*, 1983, 9, 281–287 describe the reduction of elemental sulfur during the discharging of a lithium/sulfur cell to soluble lithium polysulfides in high concentrations in the electrolyte. Even partial reduction of the solid sulfur in the cathode forms polysulfides, such as lithium octasulfide, that are soluble in the organic electrolytes. In battery cells, these soluble polysulfides diffuse from the cathode into the surrounding electrolyte and may react with the lithium anode leading to its fast depletion. This leads to reduced capacity of the battery cell.

In attempts to reduce the problems associated with the generation of soluble polysulfides in alkali metal battery cells comprising elemental sulfur, battery cells have been developed utilizing cathodes comprised of sulfur-containing materials in which sulfur is chemically bound to an organic or carbon polymer backbone or to a low molecular weight organic compound. One such class of electroactive sulfur-containing materials has been referred to as organo-sulfur materials. Herein, the term "organo-sulfur materials" means a material containing organic sulfur compounds with only single or double carbon-sulfur bonds or sulfur-sulfur bonds forming disulfide (—S—S—) linkages.

U.S. Pat. Nos. 4,833,048 and 4,917,974 to Dejonghe et at. disclose liquid sulfur-containing cathodes comprising organo-sulfur materials of the formula, $(R(S)_y)_n$, where y=1 to 6; R is one or more different aliphatic or aromatic organic moieties having 1 to 20 carbon atoms; and n is greater than 1. U.S. Pat. No. 5,162,175 to Visco et al. describes the use of 1 to 20 weight percent of conductor particles, such as carbon black, in solid composite cathodes containing organo-sulfur materials having disulfide electroactive groups. These organo-sulfur materials undergo polymerization (dimerization) and de-polymerization (disulfide cleavage) upon the formation and breaking of the disulfide bonds. The de-polymerization which occurs during the discharging of the cell results in lower molecular weight polymeric and monomeric species, namely soluble anionic organic sulfides, which may dissolve into the electrolyte and cause self discharge, reduced capacity, and eventually complete cell failure, thereby severely reducing the utility of organo-sulfur materials as a cathode-active material in secondary batteries. Although the soluble discharge products are typically soluble organic sulfides rather than the inorganic polysulfides of the type formed with elemental sulfur, the detrimental effects on electrochemical efficiency and cycle life are similar. In addition, the organo-sulfur materials typically contain less than 50 weight per cent of sulfur so they have a much lower energy density or theoretical specific capacity than elemental sulfur.

U.S. Pat. No. 5,324,599 to Oyama et al. discloses a solid composite cathode comprising a combination of a compound having a disulfide group and a conductive polymer, or an organo-disulfide derivative of a conductive polymer. In one variation, a complex is formed from a disulfide compound and a conductive polymer in a composite cathode layer so that the disulfide compound is not likely to leak out of the composite cathode into the electrolyte of the rechargeable battery.

In a similar approach to overcome the dissolution problem with organo-sulfur materials, U.S. Pat. No. 5,516,598 to Visco et al. discloses solid composite cathodes comprising metal/organo-sulfur charge transfer materials with one or more metal-sulfur bonds, wherein the oxidation sate of the metal is changed in charging and discharging the positive electrode or cathode. The metal ion provides high electrical conductivity to the cathode, although it significantly lowers the cathode energy density and capacity per unit weight of the polymeric organo-sulfur material. There is no mention of retarding the transport of soluble reduced sulfide or thiolate anion species formed during charging or discharging of the cell.

Another class of electroactive sulfur-containing materials comprises carbon-sulfur polymer materials, for example, as described in U.S. Pat. Nos. 5,529,860, 5,601,947 and 5,690,702, and in copending U.S. patent application Ser. No. 08/602,323, now abandoned, and continued as U.S. Pat. No. 6,117,590, to Skotheim et al. These references also describe the use of conductive carbons and graphites, conductive polymers, and metal fibers, powders, and flakes as conductive fillers with carbon-sulfur polymer materials. Herein, the term "carbon-sulfur polymer materials" means materials comprising carbon-sulfur polymers with carbon-sulfur single bonds and with sulfur-sulfur bonds comprising trisulfide (—S—S—S—), tetrasulfide (—S—S—S—S—), or higher polysulfide linkages. The carbon-sulfur polymer materials comprise, in their oxidized state, a polysulfide moiety of the formula, —$S_m$—, wherein m is an integer equal to 3 or greater.

Several approaches have been described to inhibit or retard the transport or diffusion of soluble polysulfides from the cathode to the electrolyte. U.S. Pat. No. 3,806,369 to Dey et al describes an ion exchange membrane between the cathode and the electrolyte/separator layer to inhibit the passage of polysulfides or other anions from the cathode into the electrolyte. Without this barrier layer, the soluble polysulfides or other anions form insoluble films on the cathode and shorten the cycle life of the cell. U.S. Pat. No. 3,532,543 to Nole et al. describes the attempt to use copper halide salts to limit the formation of polysulfides in a solid cathode containing elemental sulfur. U.S. patent application Ser. No. 08/859,996, titled "Novel Composite Cathodes, Electrochemical Cells Comprising Novel Composite Cathodes, and Processes for Fabricating Same" to the common assignee, discloses the addition of a class of electroactive transition metal chalcogenide materials to sulfur-containing cathodes to encapsulate or entrap the sulfur-containing materials to retard the transport of soluble polysulfides and sulfides from the cathode into the electrolyte.

Barrier layers, as for example those described heretofore, can be effective in preventing excessive diffusion of soluble cathode reduction products, such as inorganic polysulfides, into the electrolyte, thereby improving cycle life and safety from the levels obtained when excessive inorganic polysulfides and other soluble cathode reduction products are present in the electrolyte. However, these barrier layers may have disadvantages. Besides the cost and the non-cathode active volume occupied by the materials, they may effectively block the transport of desirable soluble or insoluble anionic species into the electrolyte. Also, the barrier layer may be only partially effective so that there is a slow buildup of soluble cathode reduction products in the electrolyte. While low concentrations of polysulfides initially may be acceptable in the early cycles of the cell, in the later charge-discharge cycles of the cell, the concentrations of the soluble polysulfides and other anions may become too high or excessive, thereby shortening the cycle life and decreasing cell safety.

Japanese Patent Publication No. 09-147868, published Jun. 6, 1997, describes the use of active carbon fibers to absorb electroactive sulfur-containing materials in cathodes of secondary batteries and to provide increased cycle life at high discharge currents. These active carbon fibers are characterized by highly microporous structures with specific surface areas above 1000 $m^2$/g, which absorb large amounts of sulfur-containing materials such as 30 to 50 weight per cent, into the pores. These active carbon fibers also have diameters greater than 1 micron, typically in the range of 2 to 6 microns.

Despite the various approaches proposed for the fabrication of high energy density rechargeable cells comprising elemental sulfur, organo-sulfur or carbon-sulfur polymer materials in a solid cathode, there remains a need for materials and cell designs that prevent the excessive out-diffusion of sulfides and polysulfides from the cathode layers in these cells, improve the electrochemical utilization of cathode active materials and cell efficiencies, and provide safe rechargeable cells with high rates and capacities over many cycles.

SUMMARY OF THE INVENTION

One aspect of the present invention pertains to a solid composite cathode for use in an electric current producing cell comprising (a) an electroactive sulfur-containing cathode material, which material, in its oxidized state, comprises a polysulfide moiety of the formula, —$S_m$—, wherein m is an integer from 3 to 10, and (b) a non-electroactive particulate material having a strong adsorption of soluble polysulfides, wherein the adsorption by said particulate material is characterized by adsorption of at least 40% of the lithium octasulfide in a 0.03 M solution of lithium octasulfide in tetraglyme with said particulate material present at the weight ratio of said particulate material to lithium octasulfide of 6.2 to 1.

In one embodiment, the adsorption by said particulate material of the lithium octasulfide in said solution is at least 60%. In one embodiment, the adsorption by said particulate material of the lithium octasulfide in said solution is at least 87%. In one embodiment, the adsorption by said particulate material of the lithium octasulfide in said solution is at least 93%. In one embodiment, the adsorption by said particulate material of the lithium octasulfide in said solution is at least 97%.

In one embodiment, the non-electroactive particulate material having strong adsorption of soluble polysulfides is selected from the group consisting of: carbons, silicas, aluminum oxides, transition metal chalcogenides, and metals. In one embodiment, the non-electroactive particulate material having strong adsorption of soluble polysulfides comprises a carbon. In one embodiment, the non-electroactive particulate material having strong adsorption of soluble polysulfides comprises a silica. In one embodiment, the non-electroactive particulate material having strong adsorption of soluble polysulfides comprises an aluminum oxide. In a particularly preferred embodiment, said aluminum oxide comprises pseudo-boehmite. In one embodiment, the non-electroactive particulate material having strong adsorption of soluble polysulfides comprises a transition metal chalcogenide. In a preferred embodiment, said chalcogenide comprises a non-electroactive vanadium oxide. In a most particularly preferred embodiment, said chalcogenide comprises an aerogel of a crystalline vanadium oxide. In one embodiment, the non-electroactive particulate material having strong adsorption of soluble polysulfides comprises a metal.

The solid composite cathodes of the present invention comprise an electroactive sulfur-containing material, which material, in its oxidized state, comprises a polysulfide moiety of the formula, —$S_m$—, wherein m is an integer from 3 to 10. In one embodiment, m is an integer from 3 to 8. In one embodiment, m is an integer from 3 to 6. In one embodiment, m is an integer from 6 to 10. In one embodiment, the polysulfide linkage comprises —S—S—S— (i.e., trisulfide). In one embodiment, the polysulfide linkage comprises —S—S—S—S— (i.e., tetrasulfide). In one embodiment, the polysulfide linkage comprises —S—S—S—S—S— (i.e., pentasulfide). In one embodiment, the polysulfide linkage comprises —S—S—S—S—S—S— (i.e., hexasulfide). In one embodiment, the polysulfide linkage comprises —S—S—S—S—S—S—S— (i.e., heptasulfide). In one embodiment, the polysulfide linkage comprises —S—S—S—S—S—S—S—S— (i.e., octasulfide).

In one embodiment, the electroactive sulfur-containing material of the solid composite cathodes of the present invention comprises elemental sulfur. In one embodiment, the electroactive sulfur-containing material comprises a carbon-sulfur polymer.

In one embodiment, the solid composite cathodes of the present invention further comprise a conductive filler not having strong adsorption of soluble polysulfides. Examples of suitable conductive fillers include, but are not limited to, carbons, graphites, active carbon fibers, metal flakes, metal powders, metal fibers, electrically conductive polymers, and electrically conductive metal chalcogenides.

In one embodiment, the solid composite cathodes of the present invention further comprise a binder.

In one embodiment, the solid composite cathodes of this invention further comprise an electrolyte.

In one embodiment, the solid composite cathodes of this invention further comprise a non-electroactive metal oxide not having a strong adsorption of soluble polysulfides, wherein the metal oxide is selected from the group consisting of: silicas, aluminum oxides, silicates, and titanium oxides.

Another aspect of the present invention pertains to electric current producing cells which comprise an anode; a solid composite cathode of the present invention, as described herein; and an electrolyte interposed between the anode and the composite cathode.

Examples of suitable anode active materials for use in the anodes of the cells of the present invention include, but are not limited to, lithium metal, lithium-aluminum alloys, lithium-tin alloys, lithium-intercalated carbons, and lithium-intercalated graphites.

Examples of suitable electrolytes for use in cells of the present invention include, but are not limited to, liquid electrolytes, gel polymer electrolytes, and solid polymer electrolytes.

In a preferred embodiment, the electrolyte comprises one or more ionic electrolyte salts and one or more polymers selected from the group consisting of: polyethers, polyethylene oxides, polypropylene oxides, polyimides, polyphosphazenes, polyacrylonitriles, polysiloxanes; derivatives of the foregoing; copolymers of the foregoing; and blends of the foregoing.

In a preferred embodiment, the electrolyte for the cell of this invention comprises one or more ionic electrolyte salts and one or more electrolyte solvents selected from the group consisting of: N-methyl acetamide, acetonitrile, sulfolanes, sulfones, carbonates, N-alkyl pyrrolidones, dioxolanes, glymes, and siloxanes, Yet another aspect of the present invention pertains to methods of manufacturing a solid composite cathode, as described herein.

Still another aspect of the present invention pertains to methods of manufacturing an electric current producing cell which employs a solid composite cathode, as described herein.

As one of skill in the art will appreciate, features of one embodiment and aspect of the invention are applicable to other embodiments and aspects of the invention.

DETAILED DESCRIPTION OF THE INVENTION

Figure 1:
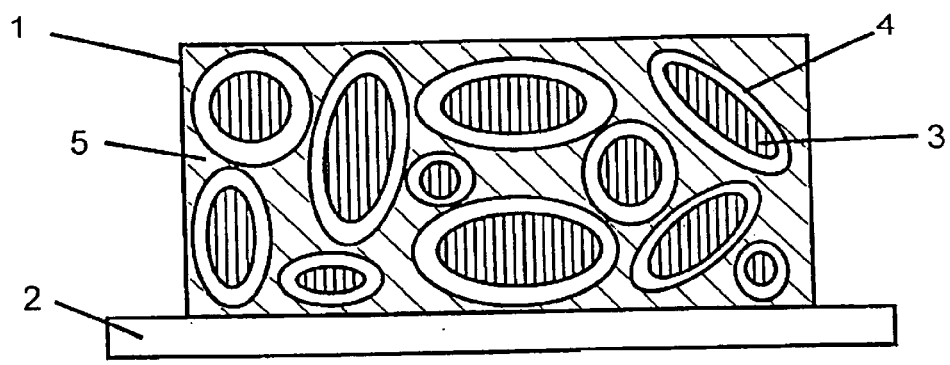
FIG. 1 shows a composite cathode on a current collector incorporating a cathode configuration wherein the electroactive sulfur-containing cathode material is encapsulated with a thin coating comprising the non-electroactive particulate material having a strong adsorption of soluble polysulfides. The thin coating acts as a polysulfide retarding barrier layer material. These "core-shell" cathode materials are bound together in a composite cathode optionally using a binder containing a conductive filler.

One aspect of the present invention pertains to a solid composite cathode for use in an electric current producing cell comprising (a) an electroactive sulfur-containing cathode material, which material, in its oxidized state, comprises a polysulfide moiety of the formula, —$S_m$—, wherein m is an integer from 3 to 10, and (b) a non-electroactive particulate material having a strong adsorption of soluble polysulfides, wherein the adsorption by said particulate material is characterized by adsorption of at least 40% of the lithium octasulfide in a 0.03 M solution of lithium octasulfide in tetraglyme with said particulate material present at the weight ratio of said particulate material to lithium octasulfide of 6.2 to 1. The solid composite cathodes of the present invention are particularly preferred for use in electrolytic cells, rechargeable batteries, fuel cells, and the like, which comprise organic electroactive sulfur-containing cathodes and which require high energy density.

Non-Electroactive Particulate Materials

The term "particulate," as used herein, pertains to the non-fibrous shape and structure of the materials. This particulate shape and structure may have a regular shape, as for example, spherical, or may have an irregular shape, but does not have a needle-like, fiber, or filament shape or structure.

The term "electroactive," as used herein, pertains to the electrochemical property of a material which takes part in the electrochemical reaction of charge or discharge in an electric current producing cell. The term "nonelectroactive," as used herein, pertains to the electrochemical property of a material which does not take part in the electrochemical reaction of charge or discharge in an electric current producing cell.

The term, "adsorption," as used herein, pertains to the tendency of molecules or adsorbate from a liquid phase to adhere to the surface of a solid. This tendency is an equilibrium-based selectivity among the different molecules in the liquid phase to compete, depending on their relative affinity for the surface of the solid, for physical adsorption, but not chemisorption, on this surface, as described in the Kirk-Othmer Encyclopedia of Chemical Technology, 4th Edition, Vol. 1, pages 493–528, John Wiley & Sons, New York, 1991, Howe-Grant editor. When the solid is microporous, this physical adsorption includes the amount of adsorbate on the surfaces of the solid and in the micropore volume of the solid. The term, "adsorbs," as used herein, pertains to undergoing the process of adsorption.

The relative ability of a non-electroactive material to retard the diffusion of electroactive materials from a solid cathode in an electric current producing cell may be evaluated by determining the efficiency with which the non-electroactive material physically adsorbs a soluble species of the electroactive material, when that soluble species is dissolved in a suitable solvent. For example, when the electroactive material in the solid cathode is a sulfur-containing material, a typical soluble species is an inorganic polysulfide, such as lithium octasulfide, and a typical suitable solvent is an ether, such as tetraethylene glycol dimethyl ether or tetraglyme. One method for characterizing the efficiency of the non-electroactive particulate material in the practice of this invention is by adding a known amount of the non-electroactive particulate material to a solution of the dissolved species of the electroactive material in a solvent at the temperature desired, typically room temperature; allowing the non-electroactive material to adsorb the dissolved species until equilibrium is reached; separating the non-electroactive material from the solution; and measuring the amount of the dissolved species adsorbed by the non-electroactive material and the amount remaining dissolved in the solvent.

The greater the percentage of dissolved species that are adsorbed by the non-electroactive particulate material, the stronger the adsorption of the dissolved or soluble species by the non-electroactive particulate material, and thus the more effective is the non-electroactive particulate material in retarding the out-diffusion and transport of these soluble electroactive materials from the cathode into the electrolyte and other parts of the electric current producing cell.

For the solid composite cathodes of the present invention comprising electroactive sulfur-containing materials, suitable non-electroactive particulate materials are those non-electroactive particulate materials having a strong adsorption of soluble polysulfides. To differentiate these non-electroactive particulate materials of the present invention from those non-electroactive particulate materials not having a strong adsorption of soluble polysulfides and thus not a part of the present invention, an adsorption test procedure was used to characterize the relative adsorptive strength or affinity for soluble polysulfides. To characterize the capability of non-electroactive particulate materials to effectively retard the diffusion of polysulfides and related anionic reduction products of sulfur-containing cathodes from the cathode to other parts of the electric current producing cell, the adsorption affinity of the non-electroactive particulate material for these anionic reduction products was evaluated by a physical adsorption experiment using lithium octasulfide as a representative adsorbate for a polysulfide. The more strongly the lithium octasulfide is adsorbed by the non-electroactive particulate material, the more effective the non-electroactive particulate material will be in retarding the out-diffusion and transport of lithium octasulfide and related anionic reduction products to outside of the solid composite cathode.

For example, a conductive carbon particulate material widely reported in experiments with sulfur-containing cathodes is SAB-50 (a tradename for Shawingan Acetylene Black, a conductive carbon pigment available from Chevron Corporation, Baytown, Tex.). The physical adsorption experiment of mixing 0.5 g of SAB-50 carbon with a 10 ml solution of 0.03 M $Li_2S_8$ (lithium octasulfide) in tetraglyme, showed only a 14% adsorption of the lithium octasulfide. 86% of the lithium octasulfide remained in the tetraglyme solution. Similarly, another conductive carbon particulate material used in sulfur-containing cathodes is VULCAN XC72R (a tradename for a carbon available from Cabot Corporation, Billerica, Mass.). By the same physical adsorption test, the XC72R carbon only adsorbed 31% of the lithium octasulfide. By contrast, three conductive carbon particulate materials of the present invention (PRINTEX XE-2; BLACK PEARL 2000, a tradename for carbon available from Cabot Corporation, Billerica, Mass.; and FW200, a tradename for carbon available from Degussa Corporation, Akron, Ohio) showed adsorption of 50%, 65%, and 95%, respectively, of the lithium octasulfide using this same test procedure for physical adsorption.

The non-electroactive particulate materials of the solid composite cathodes of the present invention comprise those non-electroactive particulate materials having a strong adsorption of soluble polysulfides, wherein this strong adsorption by the particulate material is characterized by the adsorption of at least 40% of the lithium octasulfide in a 0.03 M solution of lithium octasulfide in tetraglyme with the particulate material present at the weight ratio of the particulate material to lithium octasulfide of 6.2 to 1. In one embodiment, the adsorption by said particulate particle of the lithium octasulfide in said solution is at least 60%. In one embodiment, the adsorption by said particulate material of the lithium octasulfide in said solution is at least 87%. In one embodiment, the adsorption by said particulate material in said solution is at least 93%. In one embodiment, the adsorption by said particulate material of the lithium octasulfide in said solution is at least 97%.

In one embodiment, the non-electroactive particulate material having strong adsorption of soluble polysulfides of the solid composite cathodes of the present invention is selected from the group consisting of: carbons, silicas, aluminum oxides, transition metal chalcogenides, and metals; wherein this strong adsorption by the particulate material is characterized by the adsorption of at least 40% of the lithium octasulfide in a 0.03 M solution of lithium octasulfide in tetraglyme with the particulate material present at the weight ratio of the particulate material to lithium octasulfide of 6.2 to 1.

In one embodiment, the non-electroactive particulate material having strong adsorption of soluble polysulfides comprises a carbon. Suitable particulate carbons in the present invention are those which adsorb at least 40% of the lithium octasulfide in a 0.03 M solution of lithium octasulfide in tetraglyme with the carbon present at the weight ratio of the carbon to lithium octasulfide of 6.2 to 1, and include, but are not limited to, carbon aerogel (available from, for example, GenCorp Aerojet, Sacramento, Calif., or Ocellus, Inc., San Carlos, Calif.), PRINTEX XE-2, BLACK PEARL 2000, and FW200. Preferred particulate carbons of the present invention are those which adsorb at least 60% of the lithium octasulfide in a 0.03 M solution of lithium octasulfide in tetraglyme with the carbon present at the weight ratio of the carbon to lithium octasulfide of 6.2 to 1, and include, but are not limited to, BLACK PEARL 2000 and FW200. Particularly preferred particulate carbons of the present invention are those which adsorb at least 87% of the lithium octasulfide in a 0.03 M solution of the lithium octasulfide in tetraglyme with the carbon present at the weight ratio of the carbon to lithium octasulfide of 6.2 to 1, and include, but are not limited to, FW200. More particularly preferred particulate carbons of the present invention are those which adsorb at least 93% of the lithium octasulfide in a 0.03 M solution of the lithium octasulfide in tetraglyme with the carbon present at the weight ratio of the carbon to lithium octasulfide of 6.2 to 1, and include, but are not limited to, FW200. Most particularly preferred particulate carbons of the present invention are those which adsorb at least 97% of the lithium octasulfide in a 0.03 M solution of the lithium octasulfide in tetraglyme with the carbon present at the weight ratio of the carbon to lithium octasulfide of 6.2 to 1.

Particulate carbons that are not suitable for strong adsorption of soluble polysulfides in the solid composite cathodes of the present invention are those which adsorb less than 40% of the lithium octasulfide in a 0.03 M solution of the lithium octasulfide in tetraglyme with the carbon present at the weight ratio of the carbon to lithium octasulfide of 6.2 to 1, and include, but are not limited to, SAB-50, PRINTEX L (a tradename for carbon available from Degussa Corporation, Akron, Ohio), PRINTEX L6 (a tradename for carbon available from Degussa Corporation, Akron, Ohio), Monarch 700 (a tradename for carbon available from Cabot, Billerica, Mass.), and XC72R.

In one embodiment, the non-electroactive particulate material having said strong adsorption of soluble polysulfides comprises a silica. Suitable particulate silicas in the present invention are those which adsorb at least 40% of the lithium octasulfide in a 0.03 M solution of lithium octasulfide in tetraglyme with the silica present at the weight ratio of the silica to lithium octasulfide of 6.2 to 1, and include, but are not limited to, silica aerogel (available from, for example, GenCorp Aerojet, Sacramento, Calif.), CABOSIL M5, AEROSIL 380, and CABOSIL 530 (a tradename for silica available from Cabot, Tuscola, Ill.). Preferred particulate silicas of the present invention are those which adsorb at least 60% of the lithium octasulfide in a 0.03 M solution of lithium octasulfide in tetraglyme with the silica present at the weight ratio of the silica to lithium octasulfide of 6.2 to 1, and include, but are not limited to, AEROSIL 380 and CABOSIL 530. Particularly preferred particulate silicas of the present invention are those which adsorb at least 87% of the lithium octasulfide in a 0.03 M solution of the lithium octasulfide in tetraglyme with the silica present at the weight ratio of the silica to lithium octasulfide of 6.2 to 1, and include, but are not limited to, CABOSIL 530. More particularly preferred particulate silicas of the present invention are those which adsorb at least 93% of the lithium octasulfide in a 0.03 M solution of the lithium octasulfide in tetraglyme with the silica present at the weight ratio of the silica to lithium octasulfide of 6.2 to 1, and include, but are not limited to, CABOSIL 530. Most particularly preferred particulate silicas of the present invention are those which adsorb at least 97% of the lithium octasulfide in a 0.03 M solution of the lithium octasulfide in tetraglyme with the silica present at the weight ratio of the silica to lithium octasulfide of 6.2 to 1.

Particulate silicas that are not suitable for strong adsorption of soluble polysulfides in the solid composite cathodes of the present invention are those which adsorb less than 40% of the lithium octasulfide in a 0.03 M solution of the lithium octasulfide in tetraglyme with the silica present at the weight ratio of the silica to lithium octasulfide of 6.2 to 1, and include, but are not limited to, CABOSIL TS720 (a tradename for silica available from Cabot Corporation, Tuscola, Ill.) and CABOSIL L90 (a tradename for silica available from Cabot Corporation, Tuscola, Ill.).

In one embodiment, the non-electroactive particulate material having strong adsorption of soluble polysulfides comprises an aluminum oxide. Suitable aluminum oxides in the present invention are those which adsorb at least 40% of the lithium octasulfide in a 0.03 M solution of lithium octasulfide in tetraglyme with the aluminum oxide present at the weight ratio of the aluminum oxide to lithium octasulfide of 6.2 to 1, and includes, but is not limited to, pseudo-boehmite.

The term "pseudo-boehmite," as used herein, pertains to hydrated aluminum oxides having the chemical formula $Al_2O_3 \cdot xH_2O$ wherein x is in the range of from 1.0 to 1.5. Terms which are synonymous with "pseudo-boehmite," include "boehmite," "AlOOH," and "hydrated alumina." The materials referred to herein as "pseudo-boehmite" are distinct from other aluminum oxides, as for example, anhydrous aluminas ($Al_2O_3$, such as alpha-alumina and gamma-alumina) and hydrated aluminum oxides of the formula $Al_2O_3 \cdot xH_2O$ wherein x is less than 1.0 or greater than 1.5.

Preferred particulate aluminum oxides of the present invention are those which adsorb at least 60% of the lithium octasulfide in a 0.03 M solution of lithium octasulfide in tetraglyme with the aluminum oxide present at the weight ratio of the aluminum oxide to lithium octasulfide of 6.2 to 1, and include, but are not limited to, psuedo-boehmite. Particularly preferred particulate aluminum oxides of the present invention are those which adsorb at least 87% of the lithium octasulfide in a 0.03 M solution of lithium octasulfide in tetraglyme with the aluminum oxide present at a weight ratio of the aluminum oxide to lithium octasulfide of 6.2 to 1, and include, but are not limited to, pseudo-boehmite. More particularly preferred particulate aluminum oxides of the present invention are those which adsorb at least 93%, and most particularly preferably at least 97%, of the lithium octasulfide in a 0.03 M solution of lithium octasulfide in tetraglyme with the aluminum oxide present at the weight ratio of the aluminum oxide to lithium octasulfide of 6.2 to 1.

Particulate aluminum oxides that are not suitable for strong adsorption of soluble polysulfides in the solid composite cathodes of the present invention are those which adsorb less than 40% of the lithium octasulfide in a 0.03 M solution of lithium octasulfide in tetraglyme with the aluminum oxide present at the weight ratio of the aluminum oxide to lithium octasulfide of 6.2 to 1.

In one embodiment, the non-electroactive particulate material having strong adsorption of soluble polysulfides comprises a non-electroactive transition metal chalcogenide. As used herein, the term "non-electroactive transition metal chalcogenide" means a non-electroactive material, wherein the transition metal is at least one selected from the group consisting of: Ti, V, Cr, Mn, Fe, Nb, Mo, Ta, W, Co, Ni, Cu, Y, Zr, Ru, Rh, Pd, Hf, Re, Os, and Ir; and the chalogenide is at least one selected from the group consisting of: O, S, and Se. Suitable particulate transition metal chalcogenides in the present invention are those which adsorb at least 40% of the lithium octasulfide in a 0.03 M solution of lithium octasulfide in tetraglyme with the transition metal chalcogenide present at the weight ratio of the chalcogenide to lithium octasulfide of 6.2 to 1, and include, but are not limited to, crystalline vanadium oxide aerogel. Preferred particulate transition metal chalcogenides of the present invention are those which adsorb at least 60% of the lithium octasulfide in a 0.03 M solution of lithium octasulfide in tetraglyme with the transition metal chalcogenide present at the weight ratio of the chalcogenide to lithium octasulfide of 6.2 to 1, and include, but are not limited to, crystalline vanadium oxide aerogel. Particularly preferred particulate transition metal chalcogenides of the present invention are those which adsorb at least 87% of the lithium octasulfide in a 0.03 M solution of the lithium octasulfide in tetraglyme with the transition metal chalcogenide present at the weight ratio of the chalcogenide to lithium octasulfide of 6.2 to 1, and include, but are not limited to, crystalline vanadium oxide aerogel. More particularly preferred particulate transition metal chalcogenides of the present invention are those which adsorb at least 93% of the lithium octasulfide in a 0.03 M solution of lithium octasulfide in tetraglyme with the transition metal chalcogenide present at the weight ratio of the chalcogenide to lithium octasulfide of 6.2 to 1, and include, but are not limited to, crystalline vanadium oxide aerogel. Most particularly preferred particulate transition metal chalcogenides of the present invention are those which adsorb at least 97% of the lithium octasulfide in a 0.03 M solution of lithium octasulfide in tetraglyme with the transition metal chalcogenide present at the weight ratio of the chalcogenide to lithium octasulfide of 6.2 to 1, and include, but are not limited to, crystalline vanadium oxide aerogel.

Particulate transition metal chalcogenides that are not suitable for the strong adsorption of soluble polysulfides in the solid composite cathodes of the present invention are those which adsorb less than 40% of the lithium octasulfide in a 0.03 M solution of the lithium octasulfide in tetraglyme with the transition metal chalcogenide present at the weight ratio of the chalcogenide to lithium octasulfide of 6.2 to 1.

In one embodiment, the non-electroactive particulate material having strong adsorption of soluble polysulfides comprises a metal. The particulate material comprising a metal could be essentially a pure metal or alloy of metals or, optionally, a metal deposited on the surface of another material, such as, for example, palladium on carbon. Suitable particulate metals in the present invention are those which adsorb at least 40% of the lithium octasulfide in a 0.03 M solution of lithium octasulfide in tetraglyme with the metal present at the weight ratio of metal to lithium octasulfide of 6.2 to 1, and include, but are not limited to, palladium, copper, nickel, silver, iron, cobalt, manganese, chromium, platinum, and gold. Preferred particulate metals of the present invention are those which adsorb at least 60%, and particularly preferably at least 87%, of the lithium octasulfide in a 0.03 M solution of lithium octasulfide in tetraglyme with the metal present at the weight-ratio of the metal to lithium octasulfide of 6.2 to 1. More particularly preferred particulate metals of the present invention are those which adsorb at least 93%, and most particularly preferably at least 97%, of the lithium octasulfide in a 0.03 M solution of lithium octasulfide in tetraglyme with the metal present at the weight ratio of the metal to lithium octasulfide of 6.2 to 1.

Particulate metals that are not suitable for the strong adsorption of soluble polysulfides in the solid composite cathodes of the present invention are those which adsorb less than 40% of the lithium octasulfide in a 0.03 M solution of lithium octasulfide in tetraglyme with the metal present at the weight ratio of the metal to lithium octasulfide of 6.2 to 1.

Electroactive Sulfur-Containing Cathode Materials

One aspect of the present invention pertains to a solid composite cathode for use in an electric current producing cell comprising (a) an electroactive sulfur-containing cathode material, which material, in its oxidized state, comprises a polysulfide moiety of the formula, —$S_m$—, wherein m is an integer from 3 to 10, and (b) a non-electroactive particulate material having a strong adsorption of soluble polysulfides, as described herein.

The term "sulfur-containing cathode material," as used herein, relates to cathode active materials which comprise the element sulfur in any form, wherein the electrochemical activity involves the breaking or forming of sulfur-sulfur covalent bonds.

The nature of the electroactive sulfur-containing cathode materials useful in the practice of this invention may vary widely. The electroactive properties of elemental sulfur and of sulfur-containing materials are well known in the art, and include the reversible formation of lithiated or lithium ion sulfides during the discharge or cathode reduction cycle of the battery cell.

In one embodiment, the electroactive sulfur-containing cathode material comprises elemental sulfur.

In one embodiment, the electroactive sulfur-containing cathode material is organic, that is, it comprises both sulfur atoms and carbon atoms.

In one embodiment, the electroactive sulfur-containing cathode material is polymeric. In one embodiment, the polymeric electroactive sulfur-containing cathode material comprises a carbon-sulfur polymer, and the polysulfide moiety, —$S_m$—, is covalently bonded by one or both of its terminal sulfur atoms on a side group to the polymer backbone chain of said carbon-sulfur polymer material. In one embodiment, the polymeric electroactive sulfur-containing cathode material comprises a carbon-sulfur polymer, and the polysulfide moiety, —$S_m$—, is incorporated into the polymer backbone chain of said carbon-sulfur polymer by covalent bonding of said polysulfide moiety's terminal sulfur atoms.

Examples of polymeric electroactive sulfur-containing materials include, but are not limited to, those comprising one or more carbon-sulfur compounds of formulae $(CS_x)_n$ and $(C_2S_z)_n$. Compositions of the general formula —$(CS_x)_n$— (formula I), wherein x ranges from 1.2 to 2.3, and n is an integer equal to or greater than 2, are described in U.S. Pat. No. 5,441,831 to Okamoto et al. Additional examples include those wherein x ranges from greater than 2.3 to about 50, and n is equal to or greater than 2, as described in U.S. Pat. Nos. 5,601,947 and 5,690,702 to Skotheim et al.

Further examples of polymeric electroactive sulfur-containing materials are those of the general formula —$(C_2S_z)_n$— (formula II) wherein z ranges from greater than 1 to about 100, and n is equal to or greater than 2, as described in U.S. Pat. No. 5,529,860 and copending U.S. patent application Ser. No. 08/602,323, now abandoned, and continued as U.S. Pat. No. 6,117,590, to Skotheim et al.

The preferred materials of general formulae I and II, in their oxidized state, comprise a polysulfide moiety of the formula, —$S_m$—, wherein m is an integer equal to or greater than 3, or more preferably, wherein m is an integer from 3 to 10. In one embodiment, m is an integer from 3 to 8. In one embodiment, m is an integer from 3 to 6. In one embodiment, m is an integer from 6 to 10. In one embodiment, the polysulfide linkage comprises —S—S—S— (i.e., trisulfide). In one embodiment, the polysulfide linkage comprises —S—S—S—S— (i.e., tetrasulfide). In one embodiment, the polysulfide linkage comprises —S—S—S—S—S— (i.e., pentasulfide). In one embodiment, the polysulfide linkage comprises —S—S—S—S—S—S— (i.e., hexasulfide). In one embodiment, the polysulfide linkage comprises —S—S—S—S—S—S—S— (i.e., heptasulfide). In one embodiment, the polysulfide linkage comprises —S—S—S—S—S—S—S—S— (i.e., octasulfide).

The backbone of polymeric electroactive sulfur-containing materials may comprise —$S_m$— main chain linkages as well as covalently bound —$S_m$— side groups. Owing to the presence of multiple linked sulfur atoms, —$S_m$—, where m is an integer equal to or greater than 3, in these materials, they possess significantly higher energy densities or specific capacities than corresponding materials containing the disulfide linkage, —S—S—, alone.

Other preferred polymeric electroactive sulfur-containing materials are those comprising carbocyclic repeat groups, as described in copending U.S. Pat. Application titled, "Electroactive, Energy-Storing, Highly-Crosslinked, Polysulfide-Containing Organic Polymers for Use in Electrochemical Cells," filed on even date herewith, now U.S. Pat. No. 6,201,200 to Gorkovenko et al.

Polymeric electroactive sulfur-containing materials of the present invention typically have elemental compositions containing between about 50 weight per cent and 98 weight per cent sulfur. Preferred polymeric electroactive sulfur-containing materials have greater than 75 weight per cent sulfur. Particularly preferred polymeric electroactive sulfur-containing materials have greater than 86 weight per cent sulfur, and most particularly preferred are polymeric electroactive sulfur-containing materials with greater 30 than 90 weight per cent sulfur.

With carbon-sulfur polymer materials in solid composite cathodes, polysulfides are formed during discharge. The term "polysulfides," means as used herein, S-containing materials with two or more $S^+$ groups present. The disulfides of organo-sulfur materials form polysulfides ($RS^+$, where R is the organo-sulfur moiety to which two or more $S^+$ groups are attached) during reduction or discharge. Since the carbon-sulfur polymer materials contain large amounts of (—$S_m$—) groups where m is an integer from 3 to 10, they form organic polysulfides of the general formula $(R'S_x)$ during reduction or discharge, where x is 2 or greater and R' is the carbon-sulfur moiety to which the polysulfide group is attached. These polysulfides are typically insoluble because of their attachment to the polymer backbone, but upon continued discharge, they are further reduced to form some soluble organic polysulfides and inorganic polysulfides of the formula ($S_x^{2-}$), where x is 2 or greater.

Even though the carbon-sulfur polymer materials show improvements over organo-sulfur materials as cathode active materials because of lower amounts of soluble sulfides and because of much higher specific capacities from the multiple polysulfide linkages and the typically higher weight per cent of sulfur (of over 50 per cent, and often above 85 per cent of sulfur by weight), there is typically still some formation of soluble organic polysulfides and inorganic polysulfides during the electrochemical cycling of the carbon-sulfur polymer materials. The non-electroactive particulate materials of the present invention have a strong adsorption of soluble polysulfides and retard their out-diffusion from the solid composite cathode and thereby enhance their availability during charging to regenerate a carbon-sulfur polymer material and to improve the reversible capacity and self-discharge properties.

Solid Composite Cathodes

One aspect of the present invention pertains to solid composite cathodes for use in an electric current producing cell, which composite cathodes comprise (a) an electroactive sulfur-containing cathode material, which material, in its oxidized state, comprises a polysulfide moiety of the formula, $-S_m-$, wherein m is an integer from 3 to 10, and (b) a non-electroactive particulate material having a strong adsorption of soluble polysulfides, as described herein.

In one embodiment, the solid composite cathode is fabricated from a mixture comprising the electroactive sulfur-containing cathode material and the non-electroactive particulate material having a strong adsorption of soluble polysulfides, which mixture is deposited onto a substrate. Optionally, the mixture may further comprise conductive additives, polymeric binders, electrolytes, and other additives to further improve the electrochemical recycleability and capacity of the cells.

In one embodiment, the solid composite cathodes of this invention further comprise a non-electroactive metal oxide, which is added to the cathode coating layer to further improve the access to the electrolyte during the filling process and during the cycling of the cell. This is especially beneficial in increasing the energy density and capacity above that achieved with only the electroactive sulfur-containing material (e.g., elemental sulfur and carbon-sulfur polymer materials) and the non-electroactive particulate material having a strong adsorption of soluble polysulfides of the present invention. Examples of these non-electroactive metal oxides include silicas, aluminum oxides, silicates, and titanium oxides which adsorb less than 40% of the lithium octasulfide in a 0.03 M solution of lithium octasulfide in tetraglyme with the metal oxide present at the weight ratio of the metal oxide to lithium octasulfide of 6.2 to 1, and include, but are not limited to, CABOSIL TS720 and CABOSIL L90.

The relative amounts of electroactive sulfur-containing material, non-electroactive material having a strong adsorption of soluble polysulfides, and optional components such as conductive additives, polymeric binders, electrolytes, non-electroactive metal oxides, and other additives in the solid composite cathode may vary widely. Generally these relative amounts are determined by experimentation and chosen so as to optimize the amount of electroactive cathode material present, the energy storage capacity of the cathode, and the electrochemical performance of the solid composite cathode in an electric current producing cell. Typically, the amount of electroactive sulfur-containing material used in the solid composite cathode of the present invention will vary from about 50 weight per cent to 96 weight per cent. Preferred are solid composite cathodes comprising between 60 weight per cent and 96 weight per cent sulfur-containing material. Especially preferred are those containing greater than 80 weight per cent of sulfur-containing material.

The relative amounts of sulfur-containing cathode active material and non-electroactive particulate material having a strong adsorption of soluble polysulfides in the solid composite cathode may vary widely so long as sufficient strongly adsorbing particulate material is present to effectively provide the adsorption of soluble polysulfides for efficient utilization and cycling of the sulfur-containing cathode active material consistent with the volumetric density requirements for loading of cathode active material in the cell. Typically, the amount of strongly adsorbing non-electroactive particulate materials used in the solid composite cathodes will vary from about 5 weight per cent to about 100 weight per cent of the weight of sulfur-containing cathode active material in the cathode coating layer. Preferred solid composite cathodes are those which comprise between 5 weight per cent and 50 weight per cent of strongly adsorbing particulate materials based on the weight of sulfur-containing cathode active material. Most preferred solid composite cathodes comprise between 10 weight per cent and 25 weight per cent of strongly adsorbing particulate materials based on the weight of the sulfur-containing cathode active material.

The solid composite cathodes of the present invention may further comprise one or more materials selected from the group of conductive additives, polymeric binders, electrolytes, and other additives, usually to improve or simplify their fabrication as well as improve their electrical and electrochemical characteristics.

Useful conductive additives are those conductive materials that provide electrical connectivity to the majority of the electroactive materials in the solid composite cathode. Examples of useful conductive additives include, but are not limited to, conductive carbons (e.g., carbon blacks), graphites, metal flakes, metal powders, and electrically conductive polymers. Where these useful conductive additives are particulate materials, the useful particulate conductive additives in the present invention are those which adsorb less than 40% of the lithium octasulfide in a 0.03 M solution of lithium octasulfide in tetraglyme with the conductive additive present at the weight ratio of the conductive additive to lithium octasulfide of 6.2 to 1, and include, but are not limited to, SAB-50, PRINTEX L, PRINTEX L6, M700, and XC72R.

Further useful conductive additives in the composite cathode of the present invention are non-activated carbon nanofibers, as described in present applicant's copending U.S. Pat. Application titled "Electrochemical Cells with Carbon Nanofibers and Electroactive Sulfur Compounds", filed on even date herewith, now U.S. Pat. No. 6,194,099 to Geronov et al.

The choice of polymeric binder material may vary greatly so long as it is inert with respect to the solid composite cathode active materials. Useful binders are those materials that allow for ease of processing of battery electrode composites and are generally known to those skilled in the art of electrode fabrication. Examples of useful binders include, but are not limited to, organic polymers such as polytetrafluoroethylenes, polyvinylidene fluorides, ethylene-propylene-diene (EPDM) rubbers, polyethylene oxides (PEO), UV curable acrylates, UV curable methacrylates, and heat curable divinyl ethers. Examples of other useful binders are cationic polymers with quaternary ammonium salt groups, as described in applicant's copending U.S. Pat. Application titled "Electrochemical Cells with Cationic Polymers and Electroactive Sulfur Compounds", filed on even date herewith, now U.S. Pat. No. 6,110,619 to Zhang et al.

Examples of useful electrolytes include, but are not limited to, liquid, solid, or solid-like materials capable of storing and transporting ions, so long as the electrolyte material is stable electrochemically and chemically with respect to the anode and composite cathode materials, facilitates the transport of ions between the anode and the cathode, and is electronically non-conductive to prevent short circuiting between the anode and the cathode.

In those cases where polymeric binder and conductive additive are desired, the amounts of binder and conductive additive can vary widely and the amounts present will depend on the desired performance. Typically, when binders and conductive additives are used, the amount of binder will vary greatly, but will generally be less than about 15 weight per cent of the solid composite cathode. Preferred amounts are less than 10 weight per cent. The amount of conductive additive used will also vary greatly and will typically be less than 15 weight per cent of the solid composite cathode. Preferred amounts of conductive additives are less than 12 weight per cent. Where the strongly adsorbing non-electroactive particulate material of the present invention is electrically conductive, as for example, PRINTEX XE-2 carbon particles, and is present in the solid composite cathode, the amounts of conductive additives may be zero or considerably reduced from their typical levels.

The solid composite cathodes of the present invention may also further comprise a current collector. Suitable current collectors for use in the present invention are those known in the art for solid electroactive sulfur-containing cathodes. Examples of suitable current collectors include, but are not limited to, metal films, foils, nets, and expanded metal grids made from metals such as nickel, titanium, aluminum, tin, and stainless steel, and plastic films with conductive layers comprising metals such as aluminum, stainless steel, nickel, titanium, and tin. Such metallic current collectors may optionally have a layer comprising conductive carbon or graphite coated on the metallic layer.

Methods of Making Composite Cathodes

One aspect of the present invention pertains to methods for fabricating solid composite cathodes, as described herein.

One method employs a physical mixture of an electroactive sulfur-containing cathode material, a non-electroactive particulate material having a strong adsorption of soluble polysulfides, and optionally polymeric binders, conductive additives, electrolytes, non-electroactive metal oxides, and other additives, either as dry solids, or as a slurry in a solvent or mixture of solvents. The mixture is fabricated into a solid cathode structure of desired dimensions, for example, by casing, doctor blade coating, roll coating, dip coating, extrusion coating, calendering, and other means known in the art.

Mixing of the various components can be accomplished using any of a variety of methods so long as the desired dissolution or dispersion of the components is obtained. Suitable methods of mixing include, but are not limited to, mechanical agitation, grinding, ultrasonication, ball milling, sand milling, and impingement milling.

The formulated dispersions can be applied to supports by any of a variety of well-known coating methods and dried using conventional techniques. Suitable hand coating techniques include, but are not limited to, the use of a coating rod or gap coating bar. Suitable machine coating methods include, but are not limited to, the use of roller coating, gravure coating, slot extrusion coating, curtain coating, and bead coating. Removal of some or all of the liquid from the mixture can be accomplished by any of a variety of conventional means. Examples of suitable methods for the removal of liquid from the mixture include, but are not limited to, hot air convection, heat, infrared radiation, flowing gases, vacuum, reduced pressure, extraction, and by simply air drying if convenient.

Once formed, the solid composite cathode may optionally be calendered to provide a solid composite cathode with a desired thickness, porosity, and volumetric density of electroactive material.

Thus, in one embodiment, the present invention pertains to a method for the preparation of a solid composite cathode, said method comprising the steps of:

(a) dispersing or suspending, in a liquid medium, an electroactive sulfur-containing cathode material, as described herein, and a non-electroactive particulate material having a strong adsorption of soluble polysulfides, as described herein;

(b) casting the mixture formed in step (a) onto a substrate or placing the mixture formed in step (a) into a mold; and, (c) removing some or all of the liquid medium from the mixture of step (b) to form a solid or gel-like composite cathode in the shape or form desired.

Examples of liquid media suitable for use in the methods of the present invention include, but are not limited to, aqueous liquids, non-aqueous liquids, and mixtures thereof. Preferred liquids are non-aqueous liquids such as methanol, ethanol, isopropanol, 1-propanol, butanol, tetrahydrofuran, dimethoxyethane, acetone, toluene, xylene, acetonitrile, heptane, and cyclohexane.

Optionally, polymeric binders, conductive additives, electrolytes, non-electroactive metal oxides, and other additives may be added to the mixture at one or more of the various steps in the methods, usually at steps which involve dissolving, dispersing, or mixing. Such additives often facilitate adhesion, cohesion, current collection, and ion transport.

Another method of making the solid composite cathodes of this invention incorporates a solid composite cathode comprised of particulate sulfur-containing materials, generally less than 25 microns in diameter, individually coated with an encapsulating layer comprising the non-electroactive particulate material of the present invention. A solid composite cathode fabricated from such a "core-shell" configuration of materials is shown in FIG. 1. Here, the solid composite cathode layer 1 in contact with a current collector 2 comprises particles of the composite cathode. Each composite cathode particle is comprised of a core 3 of the sulfur-containing cathode active material with an outer shell 4 of a retarding barrier layer comprising the non-electroactive particulate material of this invention. Optionally, such a solid composite cathode may contain fillers 5 comprising conductive materials, binders, and other additives, as described herein.

Figure 2:
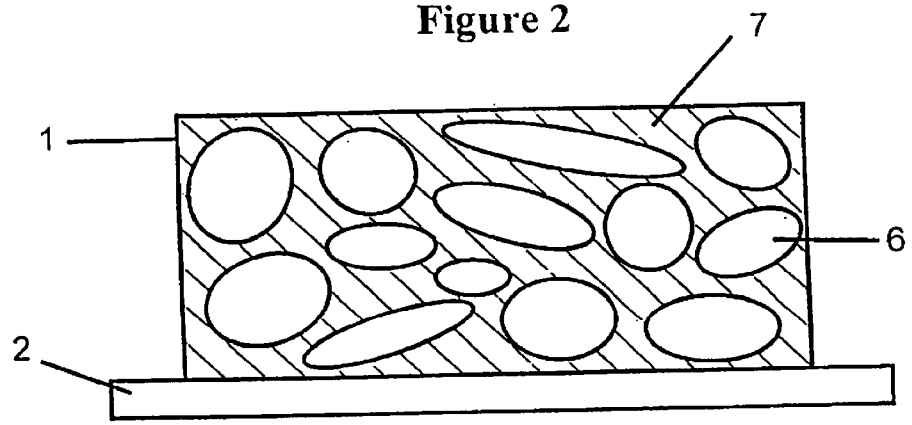
FIG. 2 shows a composite cathode configuration on a current collector wherein the non-electroactive particulate material having a strong adsorption of soluble polysulfides remains as an interface layer at the boundaries of the electroactive sulfur-containing cathode materials. The composite cathode can be represented as a composite having the electroactive sulfur-containing cathode materials dispersed in a matrix comprising the non-electroactive particulate material having a strong adsorption of soluble polysulfides in a matrix composition which optionally contains a binder and a conductive filler.

FIG. 2 illustrates a solid composite cathode structure 1 in contact with a current collector 2 wherein the solid composite cathode was made by the method of dispersing the sulfur-containing cathode materials 6 in a liquid medium also comprising the non-electroactive particulate materials of the present invention, and optionally binders, conductive materials, and other additives as described herein, and coating and drying the medium, as described herein, to form a matrix of the sulfur-containing cathode materials 6 dispersed in a phase 7 comprising the non-electroactive particulate materials, and optionally other additives. The phase 7 retards the transport of soluble polysulfides from the solid composite cathode to the electrolyte or other layers or parts of the electric current producing cell.

Figure 3:
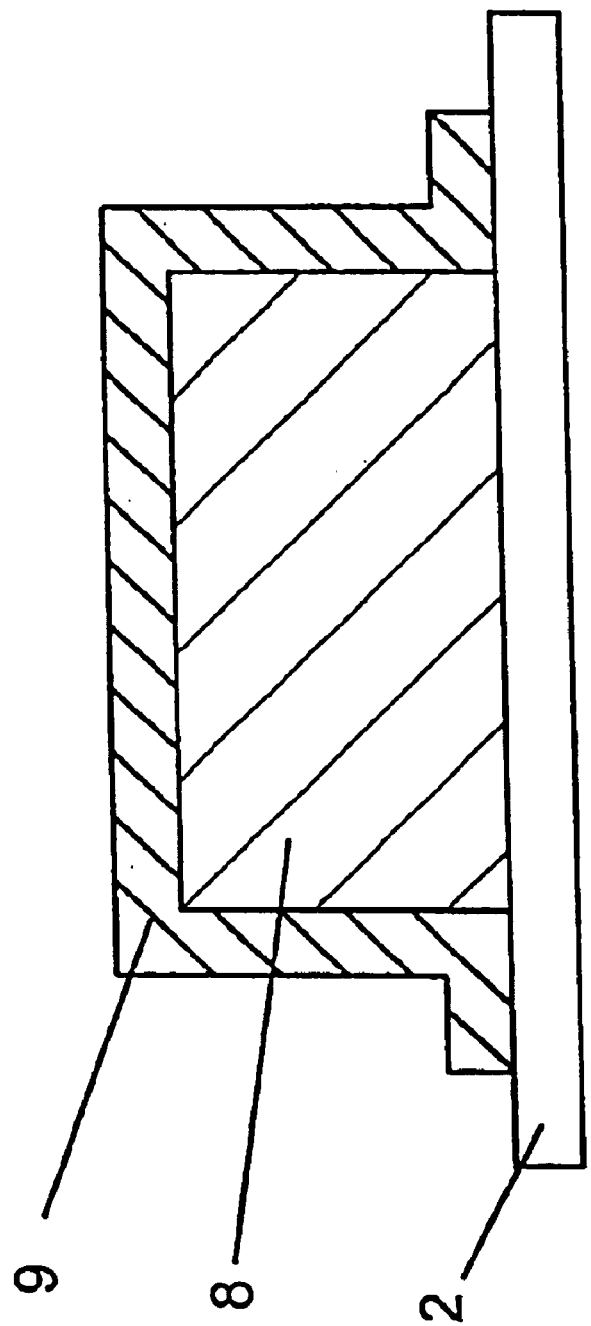
FIG. 3 shows a solid composite cathode design on a current collector wherein the electroactive sulfur-containing cathode material is coated or impregnated with a layer comprising the non-electroactive particulate material having a strong adsorption of soluble polysulfides.

Another method of making the solid composite cathode of this invention is one where a coating comprising the sulfur-containing cathode material is encapsulated or impregnated by a thin coherent film coating comprising the nonelectroactive particulate material of the present invention, as shown in FIG. 3. Here, the sulfur-containing cathode structure 8 in contact with the current collector 2 is effectively encapsulated with a layer 9 comprising the non-electroactive particulate material. Both structure 8 and layer 9 may optionally comprise the binders, conductive materials, and other additives of the present invention, as described herein.

Another method useful in this invention relates to the fabrication of a solid composite cathode by a sol-gel method wherein the sulfur-containing cathode active material, and optionally conductive fillers and binders, are suspended or dispersed in a liquid medium containing a colloidal sol of the non-electroactive particulate material of the present invention, for example, a boehmite sol or a crystalline vanadium oxide sol. From the sol, during the drying process of the coating, a sol-gel or gel is formed from an inorganic polymerization reaction that results in an interconnected, rigid network, typically having sub-micron pores.

These sol-gel methods may be used to provide solid composite cathodes in at least two different configurations. One relates to a configuration in which particulate sulfur-containing cathode active material is encapsulated with a layer comprising the non-electroactive particulate sol-gel material of the present invention. The other relates to a composite structure in which the sulfur-containing cathode active material is embedded in a continuous network comprising the non-electroactive particulate sol-gel material of the present invention.

Rechargeable Battery Cells and Methods of Making Same

One aspect of the present invention pertains to an electric current producing cell which comprises:

(a) an anode;

(b) a solid composite cathode, as described herein; and, (c) an electrolyte interposed between said anode and said cathode.

Another aspect of the present invention pertains to a method of forming an electric current producing cell, which method comprises the steps of:

(a) providing an anode;

(b) providing a solid composite cathode, as described herein; and, (c) enclosing an electrolyte between said anode and said cathode.

In one embodiment, the electric current producing cell is a secondary (rechargeable) electric current producing cell.

Suitable anode active materials for the electrochemical cells of the present invention include, but are not limited to, one or more metals or metal alloys or a mixture of one or more metals and one or more alloys, wherein said metals are selected from the Group IA and IIA metals in the Periodic Table. Examples of suitable anode active materials include, but are not limited to, alkali-metal intercalated conductive polymers, such as lithium doped polyacetylenes, polyphenylenes, polypyrroles, and the like, and alkali-metal intercalated graphites and carbons. Anode active materials comprising lithium are particularly useful for the anode of the cells of the present invention. Preferred anode materials are lithium metal, lithium-aluminum alloys, lithium-tin alloys, lithium-intercalated carbons, and lithium-intercalated graphites.

The electrolytes used in battery cells function as a medium for storage and transport of ions and, in the special case of solid electrolytes, these materials may additionally function as separator materials between the anode and the cathode. Any liquid, solid, or solid-like material capable of storing and transporting ions may be used, so long as the material is electrochemically and chemically inert with respect to the anode and the cathode, the material facilitates the transport of ions between the anode and the cathode, and the material is electronically nonconducting to prevent short circuiting between the anode and the cathode.

Examples of suitable electrolytes for use in the present invention include, but are not limited to, organic electrolytes comprising one or more materials selected from the group consisting of: liquid electrolytes, gel polymer electrolytes, and solid polymer electrolytes.

Examples of useful liquid electrolyte solvents include, but are not limited to, N-methyl acetamide, acetonitrile, carbonates, sulfones, sulfolanes, glymes, siloxanes, dioxolanes, N-alkyl pyrrolidones, substituted forms of the foregoing, and blends thereof.

These liquid electrolyte solvents are themselves useful as gel forming (plasticizing) agents for gel-polymer electrolytes. Further examples of useful gel-polymer electrolytes include, but are not limited to, those comprising polymers selected from the group consisting of: polyethylene oxides (PEO), polypropylene oxides, polyacrylonitriles, polysiloxanes, polyimides, polyethers, sulfonated polyimides, perfluorinated membranes (Nafion™ resins), divinyl polyethylene glycols, polyethylene glycol-bis-(methyl acrylates), polyethylene glycol-bis-(methyl methacrylates), derivatives of the foregoing, copolymers of the foregoing, crosslinked and network structures of the foregoing, and blends of the foregoing; to which is added an appropriate electrolyte salt.

Examples of useful solid polymer electrolytes include, but are not limited to, those comprising polymers selected from the group consisting of: polyethers, polyethylene oxides (PEO), polypropylene oxides, polyimides, polyphosphazenes, polyacrylonitriles (PAN), polysiloxanes, derivatives of the foregoing, copolymers of the foregoing, crosslinked and network structures of the foregoing, and blends of the foregoing; to which is added an appropriate electrolyte salt. Ionically conductive solid polymer electrolytes may additionally function as separator materials between the anode and the cathode.

In addition to solvents, gelling agents and ionically conductive polymers as known in the art for organic electrolytes, the organic electrolyte further comprises one or more ionic electrolyte salts, also as known in the art, to increase the ionic conductivity.

Examples of ionic electrolyte salts for use in the present invention include, but are not limited to, $MClO_4$, $MAsF_6$, $MSO_3CF_3$, $MSO_3CH_3$, $MBF_4$, $MB(Ph)_4$, $MPF_6$,

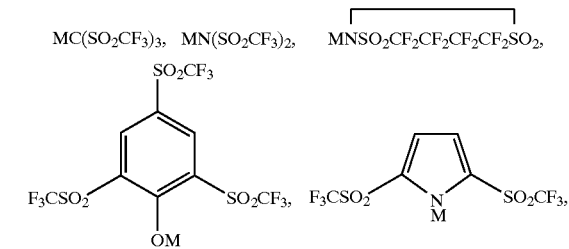

and the like, where M is Li or Na. Other electrolyte salts useful in the practice of this invention are disclosed in U.S. Pat. No. 5,538,812 to Lee et al. Preferred ionic electrolyte salts are $LiSO_3CF_3$ (lithium triflate) and $LiN(SO_2CF_3)_2$ (lithium imide).

EXAMPLES

Several embodiments of the present invention are described in the following examples, which are offered by way of illustration and not by way of limitation.

Example 1

The following general procedure was used to determine the relative adsorptive strength of various non-electroactive particulate materials for soluble lithium polysulfide solvates such as $Li_2S_8$ (lithium octasulfide). The non-electroactive particulate material to be evaluated was dried under vacuum at 80° C. for 18 hours. To 10 ml of a 30 mM (0.03 M) solution of lithium octasulfide in dry tetraglyme at 25° C. in an argon filled glove box was added 0.5 g of the non-electroactive particulate material. This dispersion was stirred for 18 hours. It was then transferred to a sealed centrifuge tube and centrifuged for 30 minutes at 4000 rpm under argon. The supernatant liquid was filtered through a 0.45 micron syringe filter and analyzed by absorption spectroscopy using the absorbance band at 450 nm for lithium octasulfide. The concentration of lithium octasulfide remaining in the solvent was then calculated using a calibration curve generated by using standardized solutions of lithium octasulfide in tetraglyme. The amount of lithium octasulfide adsorbed by the non-electroactive particulate material was then calculated from the loss of lithium octasulfide from the solution. Table I summarizes the adsorption strength of various carbons, silicas, and other particulate materials for lithium octasulfide.

TABLE I

The adsorption strengths of various carbons, silicas and other particulate materials for lithium octasulfide.

| Sample | Surface Area[f] $m^2/g$ | Final $Li_2S_8$ Concentration mM | Wt of $Li_2S_8$ Adsorbed mg/g | % Wt Uptake | % $Li_2S_8$ Adsorbed |
|---|---|---|---|---|---|
| FW 200[a] | 460 | 1.73 | 152.8 | 15.3 | 94.2 |
| Cabosil M5[b] | 100 | 12.88 | 92.7 | 9.3 | 57.1 |
| Cabosil 530[b] | 200 | 2.06 | 151 | 15.1 | 93.1 |
| Carbon Printex XE-2[a] | 1000 | 15.1 | 80.6 | 8.1 | 49.7 |
| Carbon Aerogel[c] | 250 | 15.2 | 79.8 | 8 | 49.3 |
| Carbon BP 2000[b] | 1500 | 10.64 | 105 | 10.5 | 64.5 |
| Aerosil 380[a] | 380 | 8.6 | 115.8 | 11.6 | 71.3 |
| Pseudo-Boehmite[d] | 15[g] | 3.17 | 145.1 | 14.5 | 89.4 |
| Cabosil L90[b] | 90 | 19.8 | 55.1 | 5.5 | 34.0 |
| Carbon Printex L[a] | 150 | 24.2 | 31.1 | 3 | 19.3 |
| Carbon SAB-50[e] | 84 | 25.72 | 23.2 | 2.3 | 14.3 |
| Crystalline Vanadium Oxide Aerogel[h] | 25 | 0.33 | 160.5 | 16.1 | 98.9 |

[a]Degussa
[b]Cabot Corporation
[c]GenCorp Aerojet
[d]Catalysts & Chemicals Ind. Co., Ltd, Tokyo, Japan; Cataloid AS-3 supplied as a 7 wt % colloidal boehmite sol in water and dried to a pseudo-boehmite powder in-house.
[e]Chevron
[f]As supplied by Manufacturer
[g]Measured
[h]Prepared from vanadium acetoacetonate and not electroactive after heat treatment at 140° C.

Example 2

A solid composite cathode comprising elemental sulfur and a particulate carbon material was fabricated and evaluated in AA cells in the following way. A cathode slurry formulation of 85 wt. % elemental sulfur, 10 wt. % PRINTEX XE-2, and 5 wt. % polyethylene oxide (PEO) binder (5,000,000 molecular weight available from Polysciences Inc., Warrington, Pa.), using acetonitrile as the solvent, was prepared by conventional techniques. The slurry was cast by hand coating using a gap coater bar onto a two side coated 18 micron thick conductive carbon coated aluminum foil substrate (Product No. 60303 available from Rexam Graphics, South Hadley, Mass.) as a current collector and dried in a laboratory hood with exhaust of the ambient air to provide flowing air over the coating. The coating and drying process was repeated for the second side of the substrate. The total composite cathode thickness was 12 microns with an electroactive sulfur loading of 1.05 $mg/cm^2$. The volumetric density of elemental sulfur in the cathode was about 1050 $mg/cm^3$. The solid composite cathode was then wound into a AA cell with a 50 micron lithium foil anode and a 25 micron E25 SETELA (a tradename for a polyolefin separator available from Tonen Chemical corporation, Tokyo, Japan, and also available from Mobil Chemical Company, Films Division, Pittsford, N.Y.) separator and filled with a liquid electrolyte (50% 1,3-dioxolane, 35% diglyme, 10% dimethoxyethane, and 5% o-xylene by volume with 1.0 M lithium triflate salt (available from 3M corporation, St. Paul, Minn.)).

Figure 4:
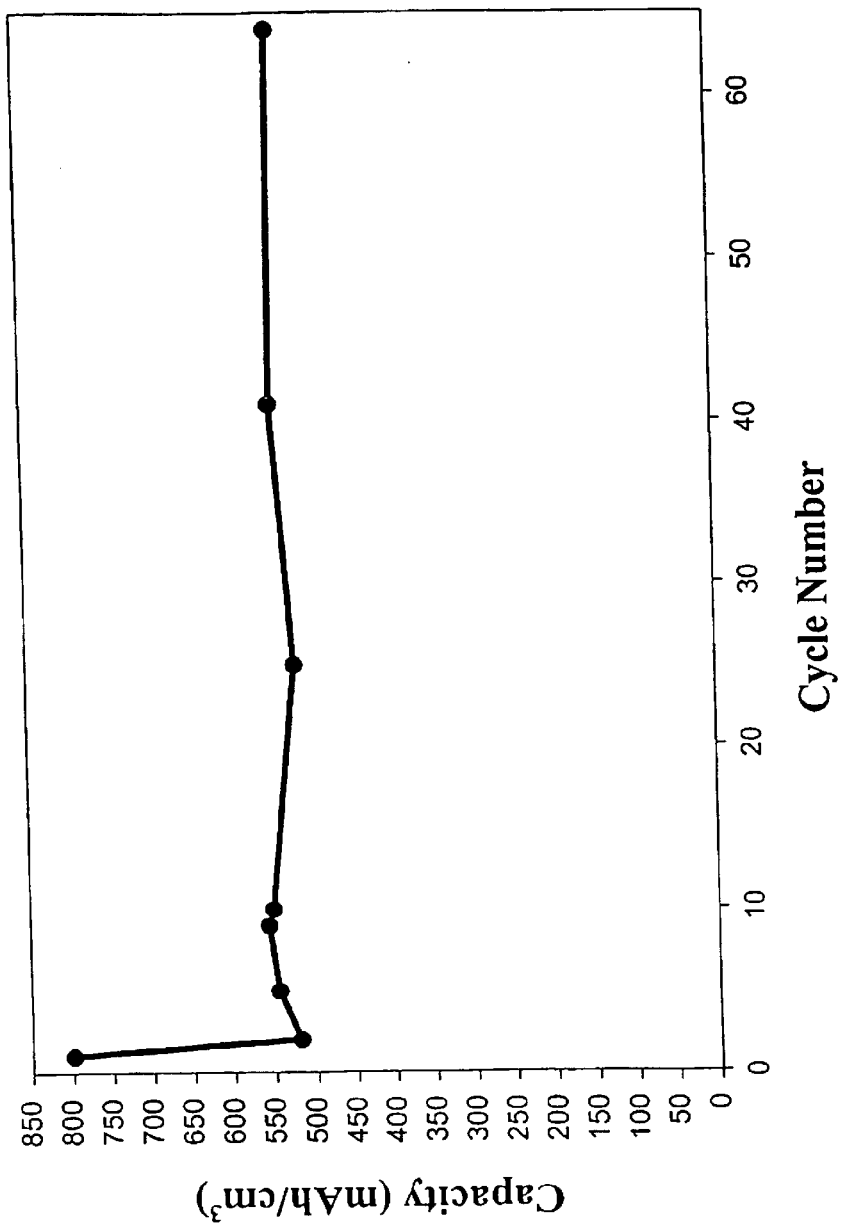
FIG. 4 shows volumetric capacity (mAh/cm$^3$ of cathode coating) versus cycle number for the AA cell of Example 2 incorporating an elemental sulfur cathode of the present invention comprising a particulate carbon of the present invention (PRINTEX XE-2, a tradename for carbon available from Degussa Corporation, Akron, Ohio) with polyethylene oxide (PEO) as a binder.

The first discharge-charge cycle was done at a current of 100 mA. Subsequent cycling was done with a discharge current of 275 mA and a charge current of 200 mA. FIG. 4 shows the volumetric capacity in $mA/cm^3$ of the cathode coating for this AA cell. After the first cycle, this volumetric capacity was still very high (above 500 $mAh/cm^3$) and stable for more than 60 cycles. Similar AA cells, except that either 10% SAB-50 carbon or 10% VULCAN XC72R carbon was substituted for the 10% PRINTEX XE-2, showed in both cases a volumetric capacity at the second discharge-charge cycle that was more than 10% lower than that of the AA cell with 10% PRINTEX XE-2 carbon and lost more than 15% of this volumetric capacity when cycled to 60 cycles.

Example 3

Composite cathodes were fabricated from carbon-sulfur polymer (made by the process described in Example 2 in copending U.S. Pat. Application titled "Electroactive, Energy-Storing, Highly Crosslinked, polysulfide-Containing Organic Polymers for use in Electrochemical Cells," filed on even day herewith by common assignee, now U.S. Pat. No. 6,201,100 to Gorkovenko et al.). The polymer was first pre-ground to disperse any clumping of polymer particles (typical mean size <10 microns). A cathode slurry was prepared with a formulation of 70% carbon-sulfur polymer, 10% conductive carbon pigment (PRINTEX XE-2), 5% non-activated PYROGRAF-III carbon nanofibers (a tradename for carbon nanofibers available from Applied Sciences, Inc., Cedarville, Ohio), 5% silica pigment (AEROSIL 380), and 10% polyethylene oxide (PEO with a molecular weight of 5,000,000 available from Polysciences Inc., Warrington, Pa.) by weight, in a mixed solvent of water and n-propanol (80:20 volume ratio) in a ball mill jar containing ceramic cylinders. The solids content of the slurry was 12 wt %. The mixture was ball milled for 20 hours. The slurry was cast (hand drawn with a gap coater bar) onto both sides of a 17.5 micron thick conductive carbon coated aluminum foil (Product No. 60303, Rexam Graphics) as a current collector. The coating was dried under ambient conditions overnight, and then under vacuum at 60° C. for one hour. The resulting dry cathode coating had a thickness of about 20 to 25 microns on each side of the current collector with a density or loading of carbon-sulfur polymer in the range of 0.63 to 0.97 $mg/cm^2$. The volumetric density of the carbon-sulfur polymer in the solid composite cathode layer was in the range of 319 to 385 $mg/cm^3$.

Wound AA size cells were fabricated from these cathodes with a 75 micron lithium foil anode and a 25 micron E25

Figure 5:
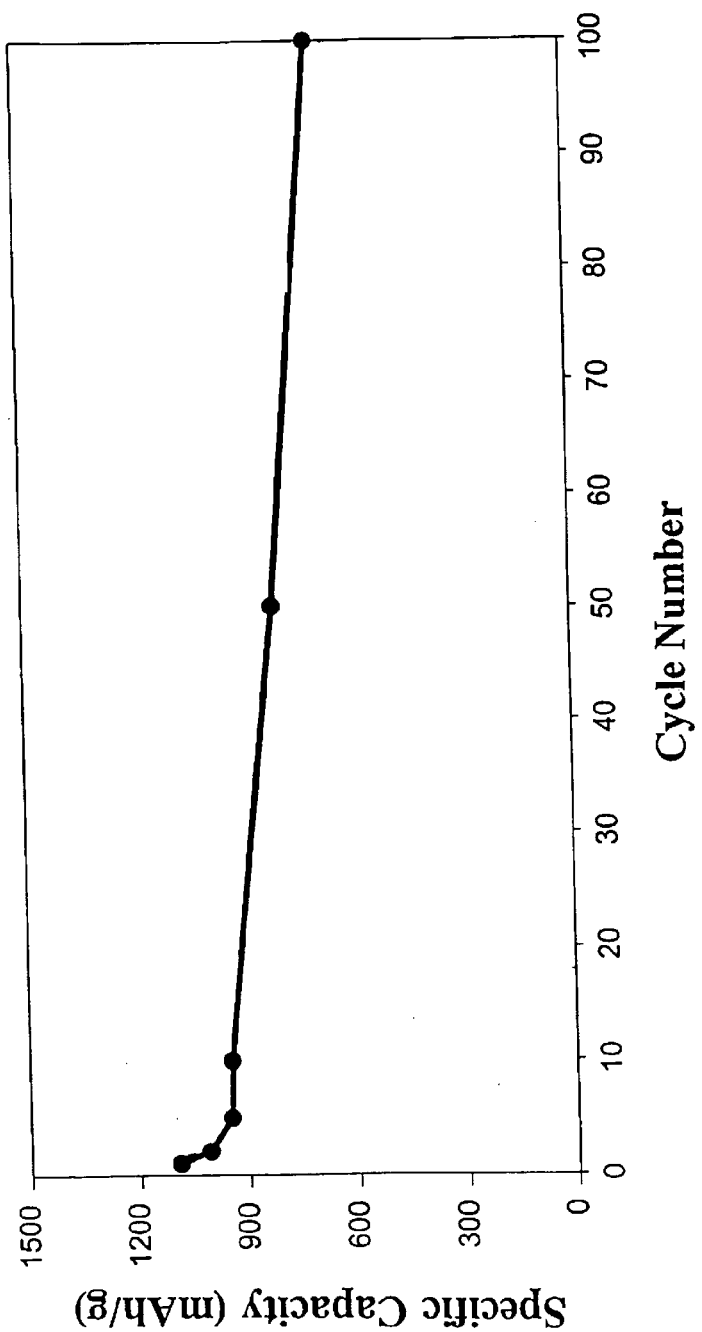
FIG. 5 shows a plot of cell specific capacity versus cycle number for up to 100 cycles for the AA lithium battery cell of Example 3 with a solid composite cathode comprising a carbon-sulfur polymer with a particulate carbon and silica pigment of the present invention.

SETELA separator. The cells were filled with a liquid electrolyte (50% 1,3-dioxolane, 20% diglyme, 10% sulfolane, and 20% dimethoxyethane by volume with 1.0 M lithium triflate salt). The cells were cycled at a rate of charge and discharge of C/3 (0.2 mA/cm$^2$) and C/2 (0.33 mA/cm$^2$) respectively. Cell performance data at 25° C. (FIG. 5) showed that the carbon-sulfur polymer cathode had excellent capacity and good stability, with specific capacities of about 1000 mAh/g for the first 10 cycles and 700 mAh/g at the 100th cycle. The cells showed a low rate of capacity loss with cycling with a value of about 0.29% per cycle.

Similar AA cells, except that 10% SAB-50 was substituted for the 10% PRINTEX XE-2, showed specific capacities for the carbon-sulfur polymer that were more than 30% lower at the 100th cycle compared to the AA cells with 10% PRINTEX XE-2 present.

Similar AA cells with 10% PRINTEX XE-2, except that 5% CABOSIL L90 was substituted for the 5% AEROSIL 380, showed specific capacities for the carbon-sulfur polymer that were more than 15% lower at the 100th cycle compared to the AA cells with 10% PRINTEX XE-2 and 5% AEROSIL 380.

While the invention has been described in detail and with reference to specific embodiments thereof, it will be apparent to one skilled in the art that various changes and modifications can be made without departing from the spirit and scope thereof

What is claimed is:

1. A solid cathode for use in an electric current producing cell, the cathode comprising:
   (a) an electroactive sulfur-containing material;
   (b) a non-electroactive particulate non-fibrous material having an adsorption of at least 40% of lithium octasulfide in a 0.03 M solution of lithium octasulfide in tetraglyme with the particulate non-fibrous material present at a weight ratio of the particulate non-fibrous material to lithium octasulfide of 6.2 to 1, and wherein the particulate non-fibrous material comprises a carbon.

2. The cathode of claim 1, wherein the electroactive sulfur-containing material comprises elemental sulfur.

3. The cathode of claim 1, wherein the electroactive sulfur-containing material comprises a carbon-sulfur polymer.

4. The cathode of claim 1, wherein the adsorption by the particulate non-fibrous material of the lithium octasulfide in the solution is at least 60%.

5. The cathode of claim 1, wherein the adsorption by the particulate non-fibrous material of the lithium octasulfide in the solution is at least 87%.

6. The cathode of claim 1, wherein the cathode further comprises a conductive filler that includes one or more materials selected from the group consisting of conductive carbons, graphites, active carbon fibers, metal flakes, metal powders, electrically conductive polymers, and electrically conductive metal chalcogenides;
   wherein the conductive filler adsorbs less than 40% of lithium octasulfide in a 0.03 M solution of lithium octasulfide in tetraglyme with the conductive filler present at the weight ratio of the conductive filler to lithium octasulfide of 6.2 to 1.

7. The cathode of claim 1, wherein the cathode further comprises a binder.

8. The cathode of claim 1, wherein the cathode comprises from 50 to 96% by weight of the electroactive sulfur-containing material, and from 5 to 50% by weight of the non-electroactive particulate material.

9. The cathode of claim 7, wherein the cathode comprises less than about 15% by weight of the binder.

10. An electric current producing cell comprising:
    (a) an anode comprising lithium;
    (b) a solid cathode comprising:
       (i) an electroactive sulfur-containing material; and
       (ii) a non-electroactive particulate non-fibrous material having an adsorption of at least 40% of lithium octasulfide in a 0.03 M solution of lithium octasulfide in tetraglyme with the particulate non-fibrous material present at a weight ratio of the particulate non-fibrous material to lithium octasulfide of 6.2 to 1, and wherein the particulate non-fibrous material comprises a carbon; and
    (c) an electrolyte interposed between the anode and the cathode.

11. The cell of claim 10, wherein the electroactive sulfur-containing material comprises elemental sulfur.

12. The cell of claim 10, wherein the electroactive sulfur-containing material comprises a carbon-sulfur polymer.

13. The cell of claim 10, wherein the adsorption by the particulate non-fibrous material of the lithium octasulfide in the solution is at least 60%.

14. The cell of claim 10, wherein the adsorption by the particulate non-fibrous material of the lithium octasulfide in the solution is at least 87%.

15. The cell of claim 10, wherein the solid cathode further comprises a conductive filler that includes one or more materials selected from the group consisting of conductive carbons, graphites, active carbon fibers, metal flakes, metal powders, electrically conductive polymers, and electrically conductive metal chalcogenides;
    wherein the conductive filler adsorbs less than 40% of lithium octasulfide in a 0.03 M solution of lithium octasulfide in tetraglyme with the conductive filler present at the weight ratio of the conductive filler to lithium octasulfide of 6.2 to 1.

16. The cell of claim 10, wherein the cathode further comprises a binder.

17. The cell of claim 10, wherein the anode comprises one or more anode active materials selected from the group consisting of lithium metal, lithium-aluminum alloys, lithium-tin alloys, lithium-intercalated carbons, and lithium-intercalated graphites.

18. The cell of claim 10, wherein the electrolyte comprises one or more materials selected from the group consisting of liquid electrolytes, gel polymer electrolytes, and solid polymer electrolytes.

* * * * *